United States Patent Office 3,254,982
Patented June 7, 1966

3,254,982
HERBICIDAL COMPOSITION
Victor A. Renner, Marysville, Ohio, assignor to The O. M. Scott & Sons Company, Marysville, Ohio, a corporation of Ohio
No Drawing. Filed May 17, 1962, Ser. No. 195,418
The portion of the term of the patent subsequent to February 5, 1980, has been disclaimed
6 Claims. (Cl. 71—2.2)

This application is a continuation-in-part of application No. 60,287, filed October 4, 1960, by Victor A. Renner for "Herbicidal Process and Product," now Patent No. 3,076,699, granted February 5, 1963.

This invention relates to herbicidally active compositions of matter and to a method of converting or renovating cultivated areas. More particularly this invention involves in its preferred form quickly killing substantially all vegetation such as weeds and grasses in a selected area, without harming soil or adjacent ornamentals, and re-establishing desired vegetative growth.

Heretofore, the method of converting or transforming a turf or pasture area of poor quality into one having desired characteristics was either (a) a gradual eradication of a limited number of weeds and replacement with desirable grasses or plants, or (b) laborious time consuming procedures of removing or turning under weeds and undesirable grasses by tilling and subsequently reseeding or laying down new sod. With the use of selective weed controls, the first method may eventually give a desirable turf. Gradual replacement of the killed weeds with desirable grasses may require years of effort. The second method with or without non-selective chemicals is not only time consuming and laborious but also expensive. Furthermore tilled soil areas require regrading and are subject to erosion by wind and washing rains.

Historically, materials such as calcium cyanamide, sodium arsenite, methyl bromide, sulfuric acid, sodium chlorate, oils, iron sulphate, and Vapam have been used to kill all vegetation. However, these materials have severe limitations in that they either have long residual activity, are difficult to apply, are toxic to personnel applying them, or are damaging to surrounding vegetation such as ornamentals or trees.

Long residual activity is detrimental since it delays the establishment of a new lawn and prevents seeding into the stubble when the stubble is in optimum condition to act as a mulch.

Briefly, in accordance with the present invention substantially all vegetation is quickly killed by application of one or more herbicidally active compositions, and new and desirable plants may then be rapidly and safely developed in the residual stubble. The compositions which have been found suitable are capable of producing the desired kill and yet leave no residual toxicity in the soil or bed of stubble, thereby enabling immediate reseeding with desirable vegetation. Residual stubble is of great value in that it acts as a mulch by sheltering the seed and developing seedlings against drying sun and wind, frost and freezing weather and stabilizes seed, seedling and soil against washing rains.

It is therefore a primary object of the present invention to provide a novel method of converting or renovating an area having vegetative growth in the shortest possible length of time and to provide novel compositions of matter for killing vegetative growth and particularly suited for use in said converting or renovating method.

Another object of this invention is to provide a method of converting or renovating an area such as lawns or turf areas by applying to said area a composition capable of killing substantially all vegetation and establishing a bed of stubble into which seed of a desired plant or plants may be cultivated.

Another object of this invention is to provide a novel method of converting or renovating areas such as lawns, parks or turf areas by applying a composition of matter preferably in granular form capable of killing substantially all of the unwanted vegetation therein and establishing a bed of stubble which forms a desirable mulch suitable for immediate reseeding, the composition preferably being applied in one or two applications for killing perennial as well as annual plants.

Another object is to provide novel compositions especially adapted for use in killing vegetation and establishing a bed of stubble such compositions being easily and safely handled, having low mammalian toxicity and short residual phytotoxicity and being capable of rapid killing of substantially all vegetation in a selected area.

Another object of this invention is to provide novel compositions especially adapted for use in killing vegetation in an area without having adverse effects on roots in the soil.

Another object of this invention is to provide novel compositions especially adapted for use in killing vegetation in an area without adverse effects on the foliage of adjacent desirable plants.

Other objectives and advantages of the present invention will become apparent to one skilled in the art from the description of the preferred mode of carrying out this invention and exemplifications thereof, and from the appended claims.

In its preferred form, the method of establishing new vegetation in a selected area involves killing the vegetation already present by applying a herbicidally active composition of matter to the area, and thereafter growing new vegetation in the selected area, preferably from seed. The method of establishing new vegetative growth is particularly suited for lawns and will be described in this connection, it being understood however, that this invention may have general application in converting or renovating any area having vegetative growth.

Application of the herbicidally active composition of matter rids the area being treated of all grass and weeds regardless of their relative desirability so that a completely new lawn, or section of a lawn may be started and treated uniformly.

The amount of herbicide that should be applied will vary with the particular active ingredients used, but in general should be sufficient to effect killing of substantially all vegetation (generally weeds and grasses in the case of lawns).

The residual stubble remaining after application of the herbicide will facilitate growing new grass for the reasons mentioned above. In general, the stubble should not be so thick as to render seed planting in the soil difficult, or to inhibit new plant growth. Raking or thinning of the stubble may therefore be desirable. However, for most cultivated lawn areas infested with one or more noxious plants such as crabgrass or a different variety of grass, a suitable bed of stubble will be produced without mechanical alteration by merely applying an effective amount of herbicide having a low residual activity.

The following specific examples illustrate the general principles involved.

*Example 1*

A granular composition was applied with a lawn spreader to provide 25 lbs. per acre of cacodylic or dimethyl arsinic acid to Kentucky bluegrass (*Poa pratensis*) turf containing coarse fescue (*Festuca elatior*) and maintained at a mowing height of 1½ inches. The preferred granular composition had the following formula:

|  | Parts By Weight | Preferred Range of Preferred Composition |
| --- | --- | --- |
| Cacodylic acid | 54 | 10–214 |
| Alkyl benzene sodium sulfonate | 47 | 1–100 |
| Hexylene glycol | 32 | 10–64 |
| Attacote [1] | 10 | 1–80 |
| Victoria blue BO dye | 1 | 1–10 |
| Vermiculite | 500 | 500 |

[1] Attacoate is a finely ground attapulgus clay.

Cacodylic acid as used herein refers to the pentavalent arsenic, dimethyl arsinic acid, represented by the chemical formula:

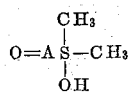

Within approximately five days all of the foliage was desiccated, brown and the plants killed. Adjacent lawn and garden areas were unaffected by this treatment. Kentucky bluegrass was seeded directly into the dead stubble at the rate of 2 lbs. per 100 sq. ft. the same day to which the granular composition, supra, was applied. The moisture was maintained at a level conducive to good germination of the grass seed. The stubble provided a mulch effect which sheltered the seedling grass. Within six weeks the area was covered with seedling grass making sufficient growth to require mowing.

Other examples of the method of this invention are as follows:

Example 2

The granular composition cited in Example 1 above was applied with a lawn spreader to provide 25 lbs. per acre of the cacodylic acid to Kentucky bluegrass turf containing tall fescue and maintained at a mowing height of two inches. A repeat application was made within 5–14 days to insure full control of tall fescue. Within approximately five days after the second application all of the foliage was desiccated, brown and the plants killed. Two days after the second treatment, Kentucky bluegrass was seeded at the rate of two lbs. per 1000 sq. ft. directly into the dead stubble. The moisture was maintained at a level conducive to good germination of the grass seed. The dead stubble protected the seedling grass against washing rains. Within six weeks the area was covered with seedling grass making sufficient growth to require mowing.

Example 3

The granular composition specified above in Example 1 was applied with a lawn spreader to provide 25 lbs. per acre of the cacodylic acid per acre to turf containing bentgrass (*Agrostis species*), tall fescue and Kentucky bluegrass maintained at a height of one inch. The treatment application was repeated seven days later to fully control or kill the bentgrass. Within five days after the second application all the vegetation was killed. Trees and adjacent lawn and garden areas was unaffected by this treatment. Due to the heavy mat or thatch cover on the soil the turf area was first prepared for seeding by partially removing the thatch by cutting grooves through to the soil surface with the use of a powered mechanical vertical mowing device (such as the Henderson Tin Cut, or Moto-Rake). Within seven days after the second treatment the area was seeded with Kentucky bluegrass at the rate of two lbs. per 1000 sq. ft. The area was fertilized with a 20–10–5 fertilizer and the moisture was maintained at a level conducive to germination of the grass seed and its subsequent growth. Within five weeks the area was covered with a substantially mature Kentucky bluegrass turf.

Example 4

A preferred granular composition was applied to an area with a lawn spreader to provide 25 lbs. per acre of the cacodylic acid. The composition had the following formula:

|  | Parts By Weight | Preferred Range |
| --- | --- | --- |
| Cacodylic acid | 54 | 10–214 |
| Alkyl benzene sodium sulfonate | 47 | 1–100 |
| Hexylene glycol | 32 | 10–64 |
| Vermiculite | 500 | 500 |

The turf area contained Kentucky bluegrass, Canadian bluegrass (*Poa compressa*), nimble will, and plantain (*Plantago major*) maintained at a height of two inches. The treatment application was repeated seven days later. After the second application, substantially all the vegetation was killed. However several semi-resistant plants required spot treatment to effect complete kill. Within seven days after the second treatment the area was seeded to Kentucky bluegrass at the rate of two lbs. per 1000 sq. ft. without further preparation. Within six weeks the area was covered with a substantially mature Kentucky bluegrass turf.

Example 5

A spray composition containing sodium cacodylate dissolved in water to make a 0.54% solution was applied with a compressed air sprayer at the rate equivalent to 20 lbs. of cacodylic acid per acre to Kentucky bluegrass turf containing nimble will (*Muhlenbergia schreberi*) and maintained at a height of 1½ inches. Within five days both the Kentuck bluegrass and nimble will were substantially browned, dessicated and killed. Trees and adjacent lawn and garden areas were not affected. Kentucky bluegrass was seeded directly into the remaining stubble at the rate of two lbs. per 1000 sq. ft. without further preparation. The moisture was maintained at a level conducive to germination of the grass seed. Within six weeks the area was covered with seedling grass making sufficient growth to require mowing.

Example 6

The spray composition consisting of cacodylic acid dissolved in water to make a 1.4% solution was applied with a compressed air sprayer to provide 25 lbs. per acre of the cacodylic acid to Kentucky bluegrass turf containing nimble will (*Muhlenbergia schreberi*) and maintained at a mowing height of two inches. A repeat application was made to fully control the nimble will. Within approximately five days after the second application all of the foliage was desiccated, brown and the plants killed. After raking, Kentucky bluegrass was seeded directly into the dead stubble at the rate of two lbs. per 1000 sq. ft. seven days after the last treatment. The area was fertilized with a 20–10–5 fertilizer at the rate of 9.0 lbs. per 1000 sq. ft. The moisture was maintained at a level conductive to good germination of the grass seed. Within five weeks the area was covered with seedling grass making sufficient growth to require mowing.

Example 7

The granular composition specified above in Example 1 was applied April 4, 1961, with a lawn spreader to provide 25 lbs. per acre of the cacodylic acid per acre to a gravel driveway containing the following weed species: Quackgrass, *Poa annua*, dandelion, peppergrass, pineapple weed, mouse ear chickweed, white clover, Veronica, nimble will, Kentucky bluegrass, knotweed, spotted spurge and smartweed. Substantially all vegetation was killed and the area rendered weed free for a period of more than six weeks. The adjacent lawn and garden areas were unaffected by this treatment.

In addition to the compositions set out in the foregoing examples, other compositions suitable for use in the method of the present invention, and for use as general vegetation killers, include an active ingredient capable of killing substantially all vegetation in a selected area but which will not leave appreciable residual toxicity so that new grass or other plants may be seeded almost immediately. In the conversion or renovation of lawns, cacodylic acid, sodium cacodylate, diquat and paraquat the chemical formulas of diquat and paraquat are given in Examples 42 and 43 used alone have been found to provide an excellent kill with low residual phytotoxicity level, and are therefore preferred. At the inception of this invention allyl alcohol was used successfully, however, its mammalian toxicity prompted development of other materials suitable for use in the present renovation or conversion method. The cacodylic acid, sodium cacodylate, diquat, and paraquat may be applied by spray or in granular form as illustrated in the foregoing examples. However, cacodylic acid and salts of cacodylic have been found to perform better when applied in granular form while diquat and paraquat have been found to work best as sprays. Granular materials such as vermiculite or attaclay have been found to be suitable carriers for the active ingredients.

A granular composition may be made by dissolving the active ingredient in a suitable solvent and impregnating the carrier or by sticking the active ingredient to the carrier with a low volatile sticking agent such as hexylene glycol as shown in copending applications S.N. 824,953, filed July 6, 1959, entitled, "Herbicidal Process and Product," now Patent No. 3,083,089, and S.N. 60,287, filed October 4, 1960, entitled, "Herbicidal Process and Product," now Patent No. 3,076,699, which patents are hereby incorporated by reference. Spray compositions may be made by simply dissolving or dispersing the active ingredient in water.

Optional materials may be added which are not essential to the formulation of a good vegetation killer, but which improve the compositions by rendering them more effective or less offensive from the standpoint of odor.

For example it has been discovered that improved results may be obtained by the addition of a surfactant such as alkyl benzene sodium sulfonate or the like. Materials such as "Attacote" were found to greatly improve the physical characteristics of cacodylic acid compositions under conditions of high humidity. These conditioning agents prevented the cacodylic acid from becoming sticky, lumpy and non-flowable, thus facilitating production of a non-lumpy, non-dusty, free flowing composition.

Other active ingredients may also be added to the composition to effect kill of resistant plants or to improve the overall kill results. Such additional active ingredients are, for example, maleic hydrazide, amino triazole, alkanolamine salt of 2,4-D acid and Dalapon. These are used in relatively small quantities as compared to the primary active ingredients and at rates which do not cause excessive residual toxicity in the soil or stubble bed.

Examples of suitable compositions are as follows:

EXAMPLE NO. 8

|  | Preferred Range | Preferred Parts By Weight |
|---|---|---|
| Cacodylic acid | 10-214 | 108 |
| Hexylene glycol | 10-65 | 32 |
| Vermiculite | 500 | 500 |

EXAMPLE NO. 9

|  | Preferred Range | Preferred Parts By Weight |
|---|---|---|
| Cacodylic acid | 10-120 | 54 |
| Water | 12-120 | 57 |
| Vermiculite | 500 | 500 |

EXAMPLE NO. 10

|  | Preferred Range | Preferred Parts By Weight |
|---|---|---|
| Cacodylic acid | 10-214 | 54 |
| Alkyl benzene sodium sulfonate | 1-100 | 47 |
| Hexylene glycol | 10-64 | 32 |
| Vermiculite | 500 | 500 |

EXAMPLE NO. 11

|  | Preferred Range | Preferred Parts By Weight |
|---|---|---|
| Cacodylic acid | 10-120 | 54 |
| Alkyl benzene sodium sulfonate | 1-100 | 47 |
| Hexylene glycol | 10-64 | 32 |
| Water | 12-120 | 6 |
| Vermiculite | 500 | 500 |

EXAMPLE NO. 12

|  | Preferred Range | Preferred Parts By Weight |
|---|---|---|
| Cacodylic acid | 10-214 | 64 |
| Alkyl benzene sodium sulfonate | 1-100 | 28 |
| Hexylene glycol | 5-50 | 10 |
| Attaclay | 500 | 500 |

EXAMPLE NO. 13

|  | Preferred Range | Preferred Parts By Weight |
|---|---|---|
| Cacodylic acid | 10-214 | 54 |
| Dodecyl benzene sulfonic acid | 1-100 | 43 |
| Hexylene glycol | 10-64 | 32 |
| Attacote | 1-80 | 6 |
| Vermiculite | 500 | 500 |

EXAMPLE NO. 14

|  | Preferred Range | Preferred Parts By Weight |
|---|---|---|
| Cacodylic acid | 10-214 | 54 |
| Alkyl benzene sodium sulfonate | 1-100 | 47 |
| Hexylene glycol | 10-64 | 87 |
| Attacote | 1-80 | 2 |
| 2,2-dichloropropionic acid | 0.5-10 | 3 |
| Vermiculite | 500 | 500 |

EXAMPLE NO. 15

|  | Preferred Range | Preferred Parts By Weight |
|---|---|---|
| Cacodylic acid | 10-214 | 44 |
| Alkyl benzene sodium sulfonate | 1-100 | 47 |
| Hexylene glycol | 10-64 | 32 |
| Attacote | 1-80 | 10 |
| Amino triazole | 0.5-30 | 18 |
| Vermiculite | 500 | 500 |

EXAMPLE NO. 16

|  | Preferred Range | Preferred Parts By Weight |
|---|---|---|
| Cacodylic acid | 10-214 | 44 |
| Alkyl benzene sodium sulfonate | 1-100 | 94 |
| Hexylene glycol | 10-64 | 32 |
| Propylene glycol butyl ether esters of 2,4-D acid | 0.5-12 | 10 |
| Vermiculite | 500 | 500 |

EXAMPLE NO. 17

|  | Preferred Range | Preferred Parts By Weight |
|---|---|---|
| Cacodylic acid | 10-214 | 44 |
| Alkyl benzene sodium sulfonate | 1-100 | 47 |
| Hexylene glycol | 10-64 | 32 |
| Attacote | 1-80 | 7 |
| 2,2-dichloropropionic acid | 0.5-10 | 3 |
| Alkanolamine salt of 2,4-D acid | 0.5-12 | 6 |
| Vermiculite | 500 | 500 |

EXAMPLE NO. 18

|  | Preferred Range | Preferred Parts By Weight |
|---|---|---|
| Sodium cacodylate | 10-214 | 156 |
| Alkyl benzene sodium sulfonate | 1-100 | 94 |
| Hexylene glycol | 10-64 | 32 |
| Vermiculite | 500 | 500 |

EXAMPLE NO. 19

|  | Preferred Range | Preferred Parts By Weight |
|---|---|---|
| Sodium cacodylate | 10-214 | 159 |
| Alkyl benzene sodium sulfonate | 1-100 | 94 |
| Hexylene glycol | 10-64 | 32 |
| 2,2-dichloropropionic acid | 0.5-10 | 3 |
| Vermiculite | 500 | 500 |

EXAMPLE NO. 20

|  | Preferred Range | Preferred Parts By Weight |
|---|---|---|
| Sodium cacodylate | 10-214 | 159 |
| Alkyl benzene sodium sulfonate | 1-100 | 94 |
| Hexylene glycol | 10-64 | 32 |
| Propylene glycol butyl ether esters of 2,4-D acid | 0.5-12 | 11 |
| Vermiculite | 500 | 500 |

EXAMPLE NO. 21

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Vermiculite | 500 | 500 |

EXAMPLE NO. 22

| Cacodylic acid | 10-214 | 54 |
|---|---|---|
| Alkyl benzene sodium sulfonate | 1-100 | 47 |
| Hexylene glycol | 10-64 | 32 |
| Celite 209 [1] | 1-80 | 8 |
| Vermiculite | 500 | 500 |

[1] Celite 209 is a finely ground diatomaceous earth.

EXAMPLE NO. 23

| Cacodylic acid | 10-214 | 54 |
|---|---|---|
| Alkyl benzene sodium sulfonate | 1-100 | 47 |
| Hexylene glycol | 10-64 | 32 |
| Hi-Sil 233 [2] | 1-80 | 4 |
| Vermiculite | 500 | 500 |

[2] Hi-Sil 233 is a synthetic precipitated hydrated silicon dioxide.

EXAMPLE NO. 24

| Cacodylic acid | 10-214 | 54 |
|---|---|---|
| Alkyl benzene sodium sulfonate | 1-100 | 47 |
| Hexylene glycol | 10-64 | 32 |
| Tricalcium phosphate | 1-80 | 10 |
| Vermiculite | 500 | 500 |

EXAMPLE NO. 25

| Cacodylic acid | 10-214 | 54 |
|---|---|---|
| Hexylene glycol | 10-64 | 32 |
| Alkyl benzene sodium sulfonate | 1-100 | 47 |
| Cab-O-Sil [3] | 1-80 | 1 |
| Vermiculite | 500 | 500 |

[3] Cab-O-Sil is a colloidal silica.

EXAMPLE NO. 26

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Cadmium carbonate | 1-10 | 4 |
| Vermiculite | 500 | 500 |

EXAMPLE NO. 27

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Cetyl trimethyl ammonium bromide | 1-40 | 14 |
| Vermiculite | 500 | 500 |

EXAMPLE NO. 28

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Tetramethylthiuramdisulfide | 3-24 | 12 |
| Vermiculite | 500 | 500 |

EXAMPLE NO. 29

|  | Preferred Range | Preferred Parts By Weight |
|---|---|---|
| Cacodylic acid | 10-214 | 45 |
| Alkyl benzene sodium sulfonate | 1-100 | 47 |
| Hexylene glycol | 10-64 | 32 |
| Attacote | 1-80 | 10 |
| Tetramethylthiuramdisulfide | 3-24 | 12 |
| Phenyl mercuric acetate | 1-20 | 4 |
| Vermiculite | 500 | 500 |

EXAMPLE NO. 30

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Versenol 120 (100%) [4] | 13-54 | 27 |
| Vermiculite | 500 | 500 |

[4] Versenol ® 120 is a concentrated solution of the trisodium salt of N-hydroxyethylethylenediaminetriacetic acid, technical.

EXAMPLE NO. 31

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Isothan DL-1 20% [5] | 10-65 | 22 |
| Vermiculite | 500 | 500 |

[5] Isothan DL-1 20% is a quaternary ammonium compound said by the manufacturer to be dialkyl demethyl ammonium bromide.

EXAMPLE NO. 32

| Cacodylic acid | 10-214 | 54 |
|---|---|---|
| Hexylene glycol | 10-64 | 32 |
| Alkyl benzene sodium sulfonate | 1-100 | 47 |
| Attacote | 1-80 | 10 |
| Pentachloronitrobenzene | 1-64 | 10 |
| Vermiculite | 500 | 500 |

EXAMPLE NO. 33

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Irgasan FP 100% [6] | 3-20 | 11 |
| Vermiculite | 500 | 500 |

[6] Irgasan FP is the registered name for 5,6-dichlorobenzoxazolinone-2.

EXAMPLE NO. 34

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Sulfur | 0.5-54 | 17 |
| Vermiculite | 500 | 500 |

EXAMPLE NO. 35

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Nalquat G-8-11 60% [7] | 1-20 | 11 |
| Vermiculite | 500 | 500 |

[7] Nalquat G-8-11 is a registered trade name and is a quaternary ammonium chloride of the following type:
1-(2-hydroxyethyl)-2-n-alkyl-1 (or 3) benzyl-2-inidazolinium chloride.

EXAMPLE NO. 36

| Cacodylic acid | 10-214 | 54 |
|---|---|---|
| Alkyl benzene sodium sulfonate | 1-100 | 47 |
| Hexylene glycol | 10-64 | 32 |
| Attacote | 1-80 | 10 |
| Oronite ADE-50 49% [8] | 1-20 | 7 |
| Vermiculite | 500 | 500 |

[8] Oronite ADE-50 is a quaternary ammonium compound having the chemical name of N alkyl benzyl-N-N-diethyl-N-ethanol ammonium chloride.

EXAMPLE NO. 37

|  | Preferred Range | Prefered Parts By Weight |
|---|---|---|
| Cacodylic acid | 10–214 | 54 |
| Hexylene glycol | 5–64 | 16 |
| Victoria blue dye | 1–10 | 1 |
| Attacote | 1–80 | 10 |
| Vermiculite |  | 500 | 500 |
| Aerosol OT 75% [9] | 1–70 | 19 |

[9] Aerosol OT 75% an anionic surfactant is a dioctyl ester of sodium sulfosuccinic acid.

EXAMPLE NO. 38

|  | Preferred Range | Prefered Parts By Weight |
|---|---|---|
| Cacodylic acid | 10–214 | 54 |
| Hexylene glycol | 5–64 | 20 |
| Victoria blue dye | 1–10 | 1 |
| Attacote | 1–80 | 10 |
| Surfonic LF 6 100% [10] | 1–70 | 14 |
| Vermiculite | 500 | 500 |

[10] Surfonic LF 6, a nonionic surfactant, is an alkyl polyoxyalkylene ether.

EXAMPLE NO. 39

|  | Preferred Range | Prefered Parts By Weight |
|---|---|---|
| Cacodylic acid | 10–214 | 54 |
| Hexylene glycol | 5–64 | 18 |
| Victoria blue dye | 1–10 | 1 |
| Attacote | 1–80 | 10 |
| Triton GR-5 60% [11] | 1–70 | 23 |
| Vermiculite | 500 | 500 |

[11] Triton GR-5 60% an anionic surfactant is a sulfonated alkyl ester.

EXAMPLE NO. 40

|  | Preferred Range | Prefered Parts By Weight |
|---|---|---|
| Cacodylic acid | 0.4–500 | 7 |
| Water | 500 | 500 |

EXAMPLE NO. 41

|  | Preferred Range | Prefered Parts By Weight |
|---|---|---|
| Sodium cacodylate | 0.4–500 | 7 |
| Water | 500 | 500 |

EXAMPLE NO. 42

|  | Preferred Range | Prefered Parts By Weight |
|---|---|---|
| Diquat [12] | 0.05–200 | 2 |
| Water | 500 | 500 |

[12] Diquat is 1,1'-ethylene-2,2'-dipyridylium dibromide.

EXAMPLE NO. 43

|  | Preferred Range | Prefered Parts By Weight |
|---|---|---|
| Paraquat [13] | 0.05–200 | 2 |
| Water | 500 | 500 |

[13] Paraquat is 1,1'-dimethyl-4-4'dipyridylium di(methyl sulfate).

"Vegetation" is used herein to include undesired weeds, grasses, and any other small plant-life, but excludes desired trees, shrubs, and other ornamentals.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A free flowing, granular, lump-free, substantially total vegetation erasing composition in which the following ingredients and proportions thereof in parts by weight are present:

(a) Dimethylarsinic acid _____ 10–260
(b) Alkyl benzene sodium sulfonate _____ 7–100
(c) Hexylene glycol _____ 10–50
(d) Vermiculite _____ 500

2. A free-flowing, granular, lump-free, vegetation erasing composition, comprising:

Parts by weight a herbicidally active ingredient selected from the group consisting of cacodylic acid and sodium cacodylate in an amount sufficient to be toxic to substantially all vegetation said composition contacts, specifically _____ 10–214
a particulate vermiculite carrier _____ 500
and a sticking agent in which the herbicidally active ingredient is insoluble _____ 10–64
said sticking agent and said herbicidally active ingredient being held by adsorption to said carrier.

3. A free-flowing, granular, lump-free, vegetation erasing composition as defined in claim 2 including a small amount of a second herbicidally active ingredient to effect kill of resistant plants.

4. A free-flowing, granular, lump-free, vegetation erasing composition as defined in claim 2 including a surfactant.

5. A free-flowing, granular, lump-free, vegetation erasing composition as defined in claim 2 including a conditioning agent selected from the group consisting of attapulgus clay, diatomaceous earth, and silicon compounds.

6. A free-flowing, granular, lump-free vegetation erasing composition as defined in claim 2 wherein said herbicidally active ingredient is cacodylic acid in approximately 54 parts by weight of the total composition.

References Cited by the Examiner

UNITED STATES PATENTS

| 2,510,839 | 6/1950 | Schmidl. |
| 2,657,165 | 10/1953 | Buntin _____ 167—30 |
| 2,678,265 | 5/1954 | Schwerdle _____ 71—2.7 |
| 2,875,119 | 2/1959 | Trademan. |
| 3,056,668 | 10/1962 | Sprague. |

OTHER REFERENCES

Brian, R. C., et al.: A New Herbicide, in Nature (magazine, London, England), 181 (4607), pp. 446–447, Feb. 15, 1958.

Frear, D. E. H.: Chemistry of Insecticides, Fungicides and Herbicides, second edition, N.Y., Van Nostrand, 1948, pp. 3–7, 277–392, 305–320 in chapters 1, 18, 19.

Hackh's Chemical Dictionary, third edition, N.Y., Blakiston, 1944, pages 153, 275, 276.

Gibson, J. W.: Chemical Weed Control, in Proceedings of Third Annual Lower Rio Grande Valley Citrus and Vegetable Institute, December 1948, Rio Grand Horticultural Club, Weslaco, Texas, pages 47–54.

Hildebrand, E. M.: 1946, War on Weeds, in Science (magazine), 103 (2677), pp. 465 468 and p. 492, April 19, 1946.

Hildebrand, E. M.: 1947, Chemical Control of Weeds, in Proceedings of the American Society for Horticultural Science, vol. 50, published December 1947, pp. 383–391.

Skogley, C. R.: Preliminary Report on the Use of Several New Arsenicals, in Proceedings of the Ninth Annual Meeting, Northeastern Weed Control Conference, N.Y., January 1955, pages 401–405.

Skogley, C. R.: The Influence of Wetting Agents on the Phytotoxicity of Several Herbicides, in Proceedings of the Eighth Annual Meeting of the Northeastern Weed Control Conference, January 1954, vol. 8, pages 1 and 293 through 299.

ABRAHAM G. STONE, Primary Examiner.

T. GRAHAM CRAVER, Examiner.

L. J. BLACKMAR, R. E. BAGWILL,
Assistant Examiners.

UNITED STATES PATENT OFFICE
CERTIFICATE OF CORRECTION

Patent No. 3,254,982  June 7, 1966

Victor A. Renner

It is hereby certified that error appears in the above numbered patent requiring correction and that the said Letters Patent should read as corrected below.

Column 3, line 27, for "100" read -- 1000 --; column 5, in the table for EXAMPLE NO. 8, second column, line 2 thereof, for "10-65" read -- 10-64 --; column 6, in the table for EXAMPLE NO. 11, third column, line 4 thereof, for "6Ϸ" read -- 64 --; in the table for EXAMPLE NO. 14, third column, line 3 thereof, for "Ɛ7" read -- 32 --; same table for EXAMPLE NO. 14, third column, line 4 thereof, for "2" read -- 7 --; column 8, in the table for EXAMPLE NO. 29, third column, line 1 thereof, for "45" read -- 54 --; in the table for EXAMPLE NO. 30, first column, line 5 thereof, for "Versenol 120 (100%)$^4$" read -- Versenol® 120 (100%)$^4$ --; column 9, in the footnote to the tables in EXAMPLES NO. 42 and 43, for "1.1′", each occurrence, read -- 1:1′ --; same column 9, in the footnote to the table in EXAMPLE No. 42, for "2.2′" read -- 2:2′ --.

Signed and sealed this 1st day of August 1967.

(SEAL)
Attest:

EDWARD M. FLETCHER, JR.  EDWARD J. BRENNER
Attesting Officer  Commissioner of Patents